UNITED STATES PATENT OFFICE 2,396,273

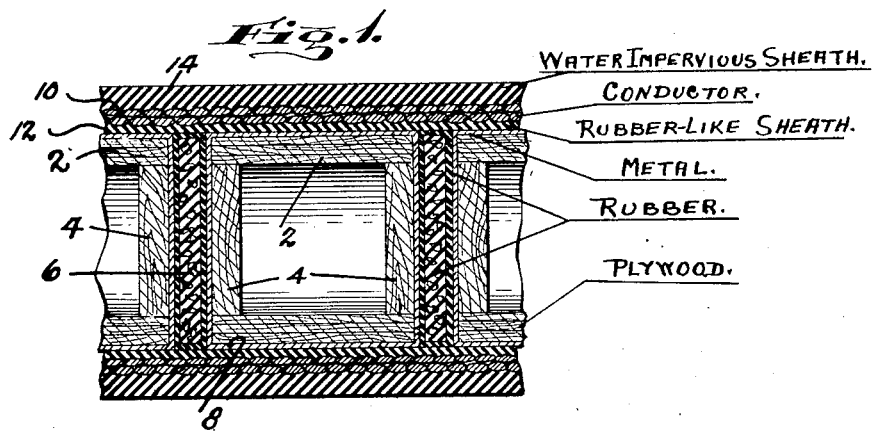
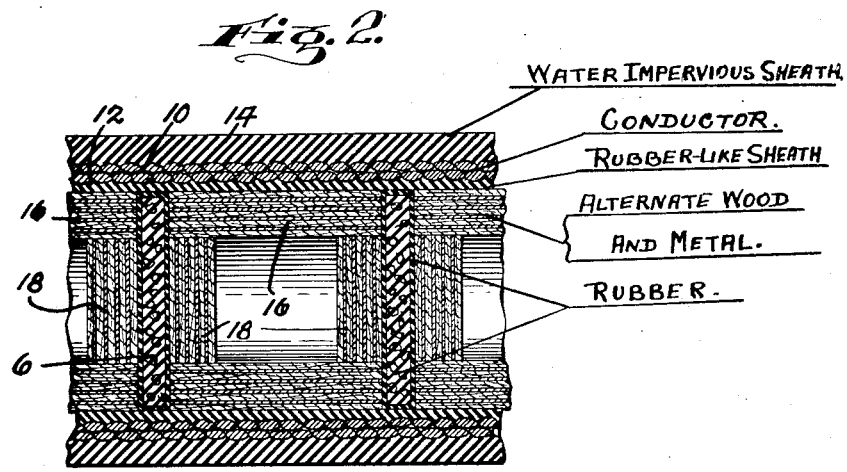
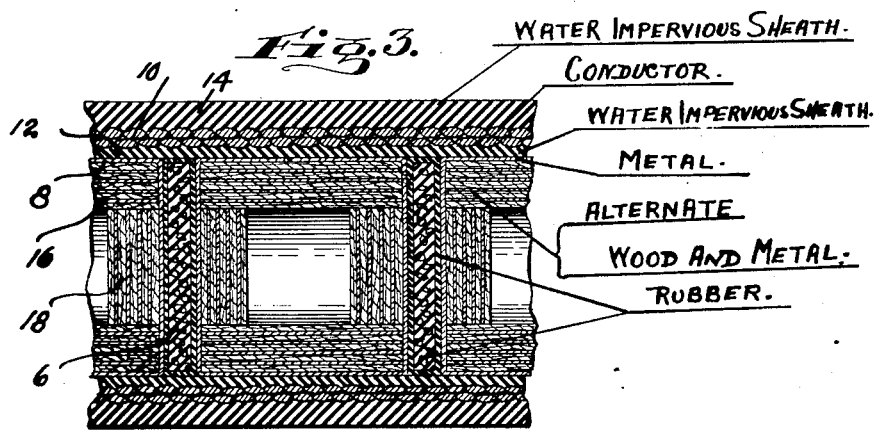

BUOYANT ELECTRIC CABLE

Harry L. Beede, Fort Lee, N. J., assignor to The Okonite-Callender Cable Company, Incorporated, Paterson, N. J., a corporation of New Jersey Original application February 6, 1943, Serial No. 474,932. Divided and this application January 6, 1944, Serial No. 517,165

10 Claims. (Cl. 174—110)

My invention relates to an improvement in buoyant electric cable, namely, electric cables of the type wherein the weight to volume ratio is such as to enable the same to float in a medium such as sea water.

Some of the objects of my invention are to provide a buoyant cable having a hollow core which will remain watertight indefinitely, and a buoyant cable which while its core is hollow is highly resistant to crushing.

In the accompanying drawing:

Fig. 1 is a fragmentary sectional elevational view of one embodiment of my invention; and Figs. 2 and 3 are similar views of two other embodiments.

Referring to the drawing in detail and first of all to Fig. 1: 2 designates a cylindrical member, composed of plywood, and provided with hermetically sealed heads 4 of plywood.

This composite structure for descriptive purposes I shall refer to hereinafter as a cell.

There are a plurality of these cells arranged along the center of the cable, adjacent cells being spaced from each other by suitable spacers 6, preferably of resilient material such as cellular rubber, for example.

The cells constructed as described are extremely resistant to crushing but if deemed necessary this resistance may be increased by maintaining the cells under internal superatmospheric pressure, say from 75 to 100 pounds per square inch.

Each cell is preferably enclosed in metal 8 which may take the form of sheet metal, or a coating or a covering, for example, of metal film, metal foil, metalized paper, etc., all referred to hereinafter as metal. The primary function of the metal 8 is to render the cell moisture and liquid tight.

10 designates the cable conductor which may be stranded directly about the assembly of cells and spacers, although I prefer to enclose the cell-and-spacer assembly in a water-impervious rubber-like sheath 12 as illustrated and to strand the conductor directly about this sheath.

About the conductor 10 is an outer non-metallic, flexible, waterproof sheath 14, such as a sheath of rubber, which is vulcanized in place.

When employing the inner sheath 12, and when using rubber spacers, it will be appreciated that during the vulcanizing of the outer and inner sheaths there will be a bonding of the spacers and the inner sheath, so that a dam is provided against the passage of water along the interior of the cable.

In the embodiment of my invention as illustrated in Fig. 2, my improved buoyant cable comprises a plurality of plywood cylinders 16, composed of alternate plies or layers of wood and metal. These cylinders are hermetically sealed with heads 18 composed of alternate plies or layers of wood and metal. The cells thus provided are laid end to end adjacent cells being separated by spacers 6. The metal layers, which alternate with the wooden layers or plies, increase the resistance of the cells against the entry of moisture and water.

The cells are highly resistant to crushing but this resistance may be increased by placing the cells under an internal superatmospheric pressure of the order of 75 to 100 pounds per square inch.

The conductor 10 may be stranded immediately about the cell-and-spacer assembly, although I prefer to enclose this assembly in a water-impervious rubber-like sheath 12 and to strand the conductor directly about this sheath.

14 designates an outer, non-metallic, flexible, waterproof sheath such as a sheath of rubber, which is vulcanized in place.

As pointed out in connection with Fig. 1, when employing the inner sheath 12, the same becomes bonded to the spacers during the vulcanizing operation, to provide a dam against the passage of water along the interior of the cable.

The embodiment of my invention as illustrated in Fig. 3 is identical with that of Fig. 2, except that each cell is enclosed in metal 8, which may take the form of sheet metal or a coating or a covering, for example, of metal film, metal foil, metallized paper, etc., all referred to as metal. As in the embodiment of my invention illustrated in Fig. 1, the metal 8 seals each cell against the entry of moisture and water.

In all embodiments of my invention it is to be understood that the weight to volume ratio is such as to enable the cable to float in a medium such as sea water, for instance.

It will be appreciated from the foregoing that my construction provides a buoyant cable wherein the center or core cells while extremely buoyant at the same time are highly resistant to crushing, so that damage to these cells either during manufacture of the cable or when in service is prevented.

This application is a division of my copending application Serial No. 474,932, filed February 6, 1943.

What I claim is:

1. A buoyant electric cable in which the weight to volume ratio is such as to enable the same to float in sea water, the combination of a plurality of center or core cells each comprising a plywood cylinder, heads for the cylinder hermetically sealed in place, each cell being enclosed in metal and under superatmospheric internal pressure, spacers intermediate adjacent cells, a conductor stranded about the assembly of cells and spacers, and an outer, flexible, water-impervious sheath.

2. A buoyant electric cable in which the weight to volume ratio is such as to enable the same to float in sea water, the combination of a plurality of center or core cells each cell comprising a hermetically sealed plywood cylinder composed of alternate plies of wood and metal, hermetically sealed heads for each cylinder, spacers intermediate adjacent cells, a conductor stranded about this assembly of cells and spacers, and an outer, flexible, water-impervious sheath.

3. A buoyant electric cable in which the weight to volume ratio is such as to enable the same to float in sea water, the combination of a plurality of plywood cylinders composed of alternate wooden and metal plies, heads for said cylinders, hermetically sealed in place and composed of the same material as the cylinders, spacers intermediate adjacent cylinders, a conductor about the assembly, and an outer, flexible, water-impervious sheath.

4. A buoyant electric cable in which the weight to volume ratio is such as to enable the same to float in sea water, the combination of a plurality of center or core cells, each comprising a hermetically sealed plywood cylinder composed of alternate plies of wood and metal, hermetically sealed heads for each cylinder, spacers intermediate adjacent cells, a rubber-like, water-impervious sheath about the assembly of cells and spacers, a conductor about the said sheath, and an outer, flexible, water-impervious sheath.

5. A buoyant electric cable in which the weight to volume ratio is such as to enable the same to float in sea water, the combination of a plurality of plywood cylinders composed of alternate wooden and metal plies, heads for said cylinders hermetically sealed in place and composed of the same material as the cylinders, spacers intermediate adjacent cylinders, a rubber-like, water-impervious sheath about the assembly, a conductor about said sheath, and an outer, flexible, water-impervious sheath.

6. A buoyant electric cable in which the weight to volume ratio is such as to enable the same to float in sea water, the combination of a plurality of center or core cells each comprising a hermetically sealed plywood cylinder composed of alternate plies of wood and metal, hermetically sealed heads for the cylinders, metal enclosing each cell, spacers intermediate adjacent cells, a conductor about the cell and spacer assembly, and an outer enclosing flexible, water-impervious sheath.

7. A buoyant electric cable in which the weight to volume ratio is such as to enable the same to float in sea water, the combination of a plurality of center or core cells each comprising a hermetically sealed plywood cylinder composed of alternate plies of wood and metal, hermetically sealed heads for the cylinders, metal enclosing each cell, spacers intermediate adjacent cells, a rubber-like, water-impervious sheath about the cell-and-spacer assembly, a conductor about said sheath, and an outer enclosing flexible, water-impervious sheath.

8. A buoyant electric cable in which the weight to volume ratio is such as to enable the same to float in sea water, the combination of a plurality of center or core cells each comprising a hermetically sealed plywood cylinder composed of alternate plies of wood and metal, hermetically sealed heads for the cylinders, each head being composed of the same material as the cylinder, metal enclosing each cell, spacers intermediate adjacent cells, a conductor about the cell-and-spacer assembly, and an outer enclosing flexible, water-impervious sheath.

9. A buoyant electric cable in which the weight to volume ratio is such as to enable the same to float in sea water, the combination of a plurality of center or core cells each comprising a plywood cylinder, composed of alternate plies of wood and metal, hermetically sealed heads therefor, each cell being under internal superatmospheric pressure, spacers intermediate adjacent cells, a conductor stranded about this assembly of cells and spacers, and an outer, flexible, water-impervious sheath.

10. A buoyant electric cable in which the weight to volume ratio is such as to enable the same to float in sea water, the combination of a plurality of plywood cylinders composed of alternate wooden and metal plies, heads for said cylinders hermetically sealed in place and composed of the same material as the cylinders, said cells being under internal superatmospheric pressure, spacers intermediate adjacent cylinders, a conductor about the assembly, and an outer, flexible, water-impervious sheath.

HARRY L. BEEDE.